United States Patent
Kirchmeier

(10) Patent No.: US 9,646,645 B2
(45) Date of Patent: May 9, 2017

(54) SPINDLE MOTOR WITH DISK CLAMP CENTERED ON COVER CAP

(71) Applicant: Minebea Co., Ltd., Nagano-ken (JP)

(72) Inventor: Tobias Kirchmeier, St. Georgen (DE)

(73) Assignee: MINEBEA CO., LTD., Nagano-Ken (JP)

( * ) Notice: Subject to any disclaimer, the term of this patent is extended or adjusted under 35 U.S.C. 154(b) by 0 days.

(21) Appl. No.: 14/959,098

(22) Filed: Dec. 4, 2015

(65) Prior Publication Data
US 2016/0163350 A1 Jun. 9, 2016

(30) Foreign Application Priority Data

Dec. 5, 2014 (DE) .................. 10 2014 017 940

(51) Int. Cl.
| | | |
|---|---|---|
| *G11B 17/038* | (2006.01) | |
| *G11B 17/028* | (2006.01) | |
| *G11B 19/20* | (2006.01) | |
| *H02K 7/08* | (2006.01) | |

(52) U.S. Cl.
CPC ...... *G11B 19/2036* (2013.01); *G11B 17/0287* (2013.01); *G11B 17/038* (2013.01); *G11B 19/209* (2013.01); *H02K 7/086* (2013.01)

(58) Field of Classification Search
None
See application file for complete search history.

(56) References Cited

U.S. PATENT DOCUMENTS

| | | | | |
|---|---|---|---|---|
| 5,517,374 A | * | 5/1996 | Katakura et al. .... | G11B 17/038 360/98.07 |
| 5,761,002 A | * | 6/1998 | Moir et al. .......... | G11B 17/038 360/98.08 |
| 6,961,210 B2 | | 11/2005 | Sheu | |
| 7,825,557 B2 | | 11/2010 | Drautz et al. | |
| 2004/0240104 A1 | | 12/2004 | Francuski et al. | |
| 2008/0310049 A1 | * | 12/2008 | Shen et al. ......... | G11B 17/0287 360/98.08 |
| 2009/0133244 A1 | * | 5/2009 | Iguchi et al. ......... | F16C 17/102 310/402 |
| 2009/0140587 A1 | | 6/2009 | Popov et al. | |
| 2010/0296190 A1 | * | 11/2010 | Yamada et al. .... | G11B 19/2036 360/99.08 |
| 2012/0113791 A1 | | 5/2012 | Yawata et al. | |
| 2013/0050873 A1 | | 2/2013 | Abe | |

(Continued)

*Primary Examiner* — Craig A. Renner
(74) *Attorney, Agent, or Firm* — Cooper & Dunham LLP

(57) ABSTRACT

The invention relates to the spindle motor for driving a hard disk drive, comprising: a stationary motor component (10, 12, 16, 18), a rotary motor component (14) rotatably mounted relative to the stationary motor component using a fluid dynamic bearing system, a bearing gap (20) disposed between the stationary motor component and the rotary motor component and filled with a bearing fluid, having at least one open end, at least one sealing gap (34) for sealing the open end, at least one cover cap (30) for covering the sealing gap, which is secured to the rotatable motor component, a disk clamp (44) for attachment of at least one magnetic storage disk (48) on the rotatable motor member and an electromagnetic drive system (40, 42) to drive the rotatable motor member. The disk clamp (44, 156) is centered on a peripheral surface of the cover cap (30, 118).

10 Claims, 2 Drawing Sheets

(56) References Cited

U.S. PATENT DOCUMENTS

| | | | |
|---|---|---|---|
| 2013/0099613 A1* | 4/2013 | Cheong et al. | G11B 19/2009 310/90 |
| 2013/0243356 A1 | 9/2013 | Yamada | |
| 2015/0029614 A1* | 1/2015 | Matsuo | G11B 19/2036 360/99.08 |
| 2015/0340057 A1* | 11/2015 | Sugiki | G11B 17/038 29/598 |

* cited by examiner

SPINDLE MOTOR WITH DISK CLAMP CENTERED ON COVER CAP

FIELD OF THE INVENTION

The invention relates to a spindle motor for driving a hard disk drive, in particular a spindle motor having a fluid dynamic bearing system as used in modern hard disk drives.

PRIOR ART

One or more spindle motors, which generally consist of a stationary motor component and a rotating motor component which is rotatably mounted relative to the stationary component by means of a bearing system are used to drive the hard disk drives with one or more storage disks.

The magnetic storage disks of the hard disk drive are arranged on the rotary motor component and driven by an electromagnetic drive system.

Fluid dynamic bearing systems, i.e. lubricant filled bearings, are usually used to rotatably support the rotary motor component, whereas ball bearings were common in the past.

Spindle motors with different designs of fluid dynamic bearing systems are known from the prior art. Typically, these spindle motors are comprised of a fluid dynamic bearing system consisting of two axially spaced fluid dynamic radial bearings and at least one fluid dynamic axial bearing. In addition, fluid dynamic bearing systems which consist of two fluid dynamic bearings having conical bearing surfaces are known.

In fluid dynamic bearings, a bearing fluid is in a bearing gap between the stationary and the rotary motor component used, which is relatively thin, so that the bearing gap having either an open or two open ends must be sealed by suitable sealing means, so that no bearing fluid can leak out.

Sealing is done, for example, via capillary seals, i.e. capillary sealing gaps or additionally by means of dynamic pump seals.

In order to protect the openings of the sealing gaps from contamination and to prevent evaporation and leakage of bearing fluid, these openings of the sealing gaps are often covered by means of a cap, which is attached to either the fixed or the rotatable motor component.

Using a disk clamp which presses the disk under spring force to the rotatable motor component is known for fastening the disk to the rotatable motor component. Accordingly, the disk clamp must be fixed to the rotary motor component.

One way of fastening the disk clamp is shown, for example, in the patent US 2013/0050873 A1. The rotatable motor component comprises a shaft having a central bore in which a screw engages, which holds the disk clamp in position.

A further possibility for fastening the disk clamp is shown in the U.S. Ser. No. 12/011,3791 A1. Here the disk clamp is formed as a ring-shaped component which is mounted by screws directly on the rotating motor component of the spindle motor.

The patents US 2013/0243356 A1 and US 2004/0240104 show similar solutions for fixing the disk clamp in which the disk clamp is also arranged directly on the rotor of the spindle motor by a screw.

The disk clamp is, in comparison to the other components of the spindle motor, relatively large and has a relatively large mass, because it must be sufficiently stable to transfer the required retaining forces on the magnetic storage disks.

Since the spindle motors are operated at very high revolution speeds, at times over 10,000 rev/min, it is essential that the clip is centered and balanced exactly in the center of the axis of rotation so that the spindle motor runs quietly and the radial or axial impact is kept low.

Until now, the disk clamp has been aligned, for example, in a mounting device and centered and fixed by the screw, as is shown in the patents US 2013/0050873 A1 and US 2013/0243356 A1.

Other solutions reveal a centering of the disk clamp to a designated peripheral surface of the rotating motor component, for example, a corresponding edge that is connected to the motor component, as shown in the patent US 2004/0240104 A1.

The centering of the disk clamp on the rotating motor component is shown in the patent US 2012/0113791 A1.

The disadvantage of a centering on the rotating motor component is, for example, that the rotating motor component and the area used for centering must be reworked with high precision, which makes it necessary to take another step in the machining of rotating motor component.

Further, the form of an annular retaining clamp requires a relatively large inner diameter compared to the outer diameter, which weakens the stability and makes it necessary to judge the thickness and to manufacture the clip out of solid material.

An additional centering sleeve is disadvantageous as a solution in that the centering sleeve has to be manufactured as a separate component and the centering sleeve must be initially centered very accurately on the rotating motor component to ensure a sufficient accuracy of the centering of the disk clamp in retrospect. Further, an additional axial height is required for the attachment of the centering sleeve, which increases the total height of the spindle motor.

DISCLOSURE OF THE INVENTION

It is therefore the object of this invention to provide a spindle motor, wherein the fixing and centering of the disk clamp is made easier so that the disk clamp can be made with the same stiffness and strength while being made even simpler and lighter in weight.

The spindle motor described for driving a hard disk drive includes a stationary motor component, a rotatable motor component which is rotatably mounted relative to the stationary motor component by means of a fluid dynamic bearing system, a bearing gap which is located between the fixed and the rotatable motor component and filled with a bearing fluid and has at least one open end, at least one sealing gap for sealing the open end of the bearing gap, at least a covering cap for covering the seal gap and fixed to the rotatable motor component, a disk clamp for the attachment of at least one magnetic memory disk on said rotatable motor component, and an electromagnetic drive system for driving the rotatable motor component.

The invention is characterized in that the holding bracket is centered on a peripheral surface of the cap.

This has the advantage that the mass of the rotatable motor component can be reduced since none of the dedicated border with the rotatable motor component or an additional centering sleeve must be provided in order to center and align the disk clamp. A lower mass reduces the power consumption of the spindle motor.

Another advantage of the invention is that the disk clamp only requires a relatively small central opening, since it is on the cap lying radially centered farther inwards. Thereby, the width and thickness of the annular disk clamp is optimized.

In particular, recesses or a profiled disk clamp may be provided, which saves weight and material, and thus also makes the rotor of the motor lighter with the same rigidity and stability of the disk clamp.

The cap is formed, for example, as a cup-shaped component with a central opening for the passage of the shaft and an outer peripheral surface on which an inner circumferential surface of the disk clamp is positioned and centered.

The disk clamp is preferably attached by means of a screw on the rotary motor component after placement and centering on the rotary motor component.

In this way, an exact concentricity of the disk clamp is provided with respect to the axis of rotation of the motor.

The attachment or alignment of the disk clamp on the cap is particularly suitable for a spindle motor having a fluid dynamic bearing system consisting of two fluid dynamic radial bearings and at least one fluid dynamic thrust bearing.

Likewise, the invention is suitable for spindle motors with two fluid dynamic bearings having conical bearing surfaces as a bearing system.

Depending on the structure of the spindle motor and the fluid dynamic bearing system, the bearing clearance of the fluid dynamic bearing system has two open ends, each sealed by a sealing arrangement, for example, a sealing gap.

In such an embodiment of the invention, the seal assemblies are each covered by a first and a second cap, whereby at the first cap the disk clamp is centered and the second cap may differ in their form from the first cap.

According to the invention, the first cap, with which the disk clamp is aligned, can be a machined rotary part, which is precisely machined to mass and machined concentric to the axis of rotation, so that an accurate adjustment and centering of the disk clamp is possible. The second cap is not used to align the disk clamp and can otherwise be designed as a discount stamping or pressing part.

In particular, the spindle motor is suitable for driving a hard disk drive with one or more storage disks and a conventional form factor of 2.5 or 3.5 inches and multiple storage disks.

DESCRIPTION OF A PREFERRED EXEMPLARY EMBODIMENT OF THE INVENTION

Figure 1:
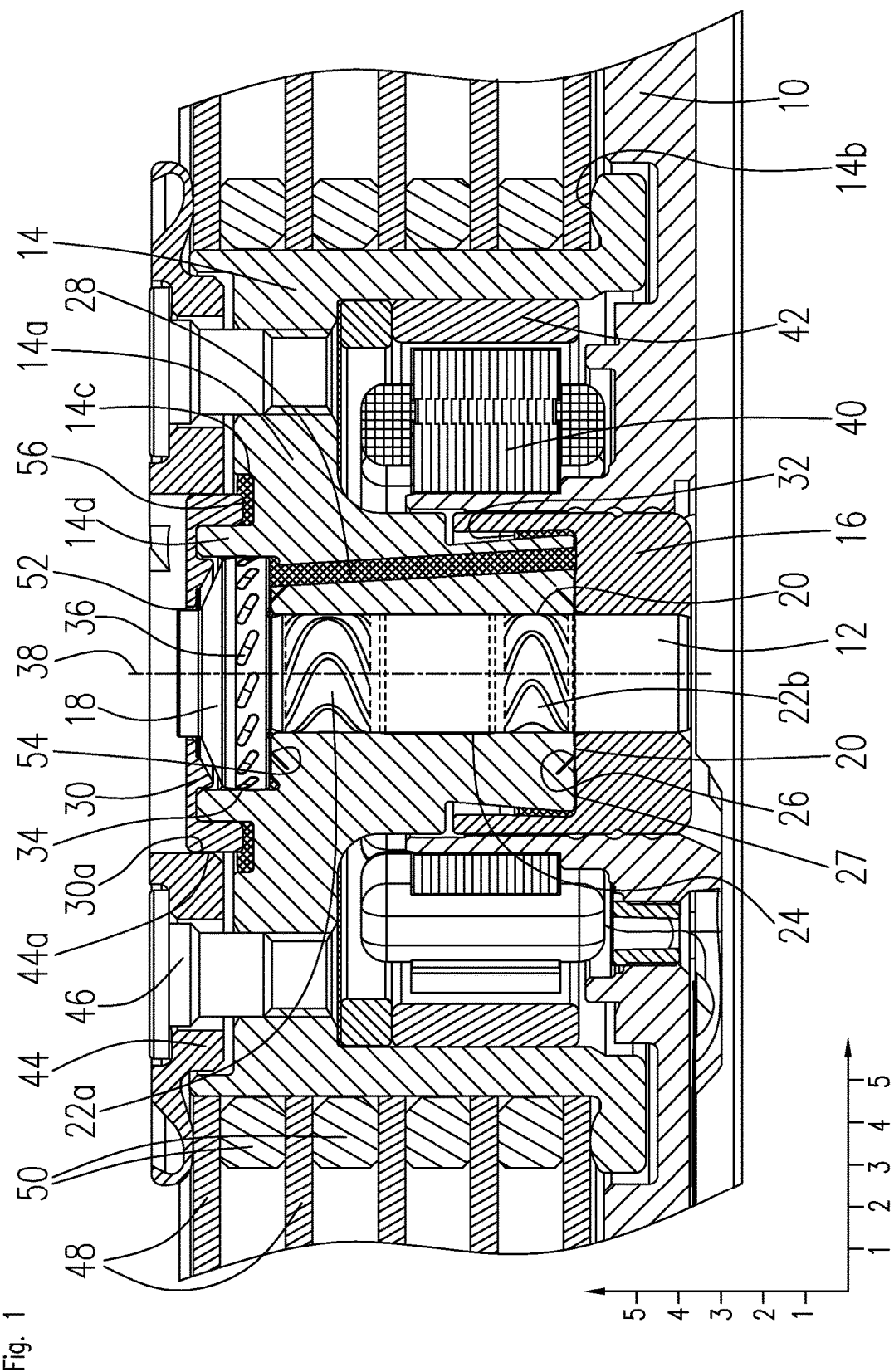
FIG. 1 shows an inventive embodiment of a spindle motor having a fluid dynamic bearing system consisting of two fluid dynamic radial bearings and two fluid dynamic thrust bearings.

FIG. 1 shows a spindle motor having a fluid dynamic bearing system according to the invention. Such a spindle motor can be used to drive storage disks of a hard disk drive.

The spindle motor includes a base plate 10 having a substantially cylindrical central aperture in which a fixed bearing component 16 is added. The fixed bearing component 16 is formed approximately cup-shaped in the cross-section and includes a central opening in which a shaft 12 is fixed. At the free end of the stationary shaft 12, an annular bearing component 18 is arranged, which is preferably integrally formed with the shaft 12. The named components 10, 12, 16, and 18 form the fixed bearing component of the spindle motor. The shaft 12 has a threaded bore (not shown) on its upper face for fastening to a housing cover of the spindle motor or the hard disk drive.

The fluid dynamic bearing system comprises a rotor component 14 with an integrally formed bearing sleeve 14a, which is disposed rotatably to the shaft 12 and the two bearing components 16, 18 and in the clearance between these components. The upper annular bearing component 18 is arranged in an annular recess of the rotor component 14. The surfaces of the shaft 12 and the two bearing components 16, 18 are separated by a bearing gap 20 open at both ends of the adjacent surfaces of the bearing sleeve 14. The bearing gap is filled with a bearing fluid, for example bearing oil.

The bearing sleeve 14a arranged on the rotor component 14 has a cylindrical bore, in which there are two cylindrical radial bearing surfaces formed on its inner periphery which are separated by an intervening separator gap 24. The bearing surfaces enclose the shaft 12 at a distance of a few micrometers to form an axially extending section of the bearing gap 20 and form, with respectively opposing bearing surfaces of the shaft, two fluid dynamic radial bearings 22a, 22b which are provided with sinusoidal or parabolic bearing groove structures.

At the lower radial bearing 22b is a radially extending section of the bearing gap 20, which connects to radially extending bearing surfaces of the bearing sleeve 14a and is formed in accordance with opposing bearing surfaces of the fixed bearing component 16. These bearing surfaces are shown as being vertically place, in regards to the axis of rotation 38, circular rings and form a fluid dynamic thrust bearing 26. The fluid dynamic thrust bearing 26 is characterized in a known manner by, for example, spiral bearing groove structures that can be mounted either on the face of the bearing sleeve 14a, the fixed bearing component 16, or both parts. Advantageously, all necessary bearing groove structures of the radial bearings 22a, 22b and the thrust bearing 26 are arranged on bearing surfaces of the bearing sleeve 14a, which simplifies the manufacture of the bearing, in particular the shaft 12 and the fixed bearing 16.

Preferably, the bearing grooves of the thrust bearing 26 run within the bearing sleeve 14a in the radial direction from the bore diameter for receiving the shaft 12 to the outer peripheral surface of the bearing sleeve 14a without interruption. In a radial inner region of the thrust bearing 26, the radial section of the bearing gap 20 is about 10 micrometers, while the bearing gap 20 widens in a radially outer region of the bearing gap into an approximately 20 microns to 100 microns wide gap 27 in which a lower second opening of a recirculation channel 28 opens.

The radially extending gap 27 is attached to a conically opening, almost axially extending sealing gap 32 proportionately filled with bearing fluid, which is shaped by opposing surfaces of the bearing sleeve 14a and the stationary bearing component 16 and seals the open end of the bearing gap. Other than the function as a capillary seal, it is used to seal the sealing gap 32 as a fluid reservoir and provides the needed amount of bearing fluid. Further, a possible thermal expansion of the bearing fluid and filling tolerances can be compensated. Both the conical section of the sealing gap 32 forming faces on the bearing sleeve 14a and the fixed bearing component 16 can be respectively inclined relative to the rotational axis 38 inward. The bearing fluid is then, due to the centrifugal force, pressed inward in the direction of the bearing gap 20 during a rotation of the bearing.

At the other end of the bearing system, above the upper radial bearing 22a, the bearing sleeve 14a forms a substantially radial extending surface which forms a radial extending gap together with an opposing surface of the second ring shaped bearing part 18.

An axially extending sealing gap 34 connects to the radially extending gap to close the fluid bearing system at this end. The sealing gap 34 is restricted through facing surfaces of the bearing sleeve 14a and the annular bearing component 18 and extends in the direction of its outer end with a preferable conical cross-section. There is preferably a dynamic pumping seal 36 along the sealing gap 34 comprised of groove structures, which exert a pumping action in the direction of the bearing gap 20 on the bearing fluid in the sealing gap during rotation of the bearing system.

The sealing gap 34 is covered by an annular cap 30. The cap has an angled out edge, which is held and glued, for example, on a circumferential edge 14d of the rotor component 14. The cap 30 can have a circumferential bulge on its lower surface, so that the upper side of the edge 14d of the rotor component is encompassed by the edge and the bulge of the cap 30.

The rotor component has a groove 14c placed radially outward from the edge 14d, in which the outer edge of the cap 30 extends. The groove 14c may be partially filled with adhesive 56, which surrounds the edge of the cap extending into the groove. The adhesive 56 is used to attach and seal the edge of the cap 30.

The inner edge of the cap 30 forms a seal gap 52 together with the outer peripheral surface of the component 18. The seal gap 52 increases the security against bearing fluid leakage from the sealing gap 34.

A recirculation channel 28 is arranged in the bearing sleeve 14a which extends axially downwards and inclined radially outwards through the bearing sleeve 14a, starting from the upper face of the bearing sleeve 14a in the gap region between the bearing gap 20 and the sealing gap 34 and ending in the gap 27 radially outwards of the axial bearing 26. The recirculation channel 28 is inclined at an angle between 3 degrees and 20 degrees relative to the axis of rotation 38, whereas the recirculation channel's 28 first upper opening has a shorter distance to the axis of rotation 38 in the region of the upper radially extending gap, and the second lower opening, which opens in the region of the radially extending gap 27 of the recirculation channel 28 and has a longer distance to the axis of rotation 38. The diameter of the recirculation channel 28 is usually between 0.4 mm and 0.7 mm.

The fluid dynamic axial bearing 26 generates a force on the rotor component 14 in the direction of the second annular bearing component 18, so that the corresponding counterforce or preload force is necessary to keep the storage system axially balanced. For this purpose, another fluid dynamic axial bearing 54 is arranged along the radially extending gap between the bearing gap and the upper gap seal 34 which generates a radial pumping action on the bearing fluid radially inward toward the bearing gap 20.

The electromagnetic drive system of the spindle motor is composed of a stator assembly 40 arranged on the base plate 10 and an annular permanent magnet 42 which is arranged at a distance concentrically surrounding the stator assembly and is located on an inner circumferential surface of the rotor component 14

One or preferably more magnetic storage disks 48 are on a contact surface 14b of the rotor component 14, each axially spaced by means of spacers 50.

The storage disks 48 are supported on the rotor component 14 by means of an annular disk clamp 44, which resiliently presses the upper storage disk 48 and also holds the storage disks 48 in position.

The disk clamp clip 44 is secured on the rotor component 4 by several screws 46.

It is important that the disk clamp is arranged exactly concentric to the axis of rotation 38 on the rotor component 14, to avoid any lack of balance and to exert a uniform action of force on the disk 48.

According to the invention the disk clamp 44 is aligned with respect to the axis of rotation 38 and centered on an outer circumferential surface 30a of the cover cap 30.

The outer circumferential surface 30a of the cap 30 is very precisely machined with regard to the perpendicularity to the motor flange 14b and the concentricity to the axis of rotation 38.

The disk clamp 44 is applied to and centered in the outer circumferential surface 30a of the cover cap 30 with an inner circumferential surface 44a.

The dimensions of the outer circumferential surface 30a of the cover cap 30 and the inner circumferential surface 44a of the disk clamp 44 are dimensioned such that there is only a very small radial gap with little play.

Figure 2:
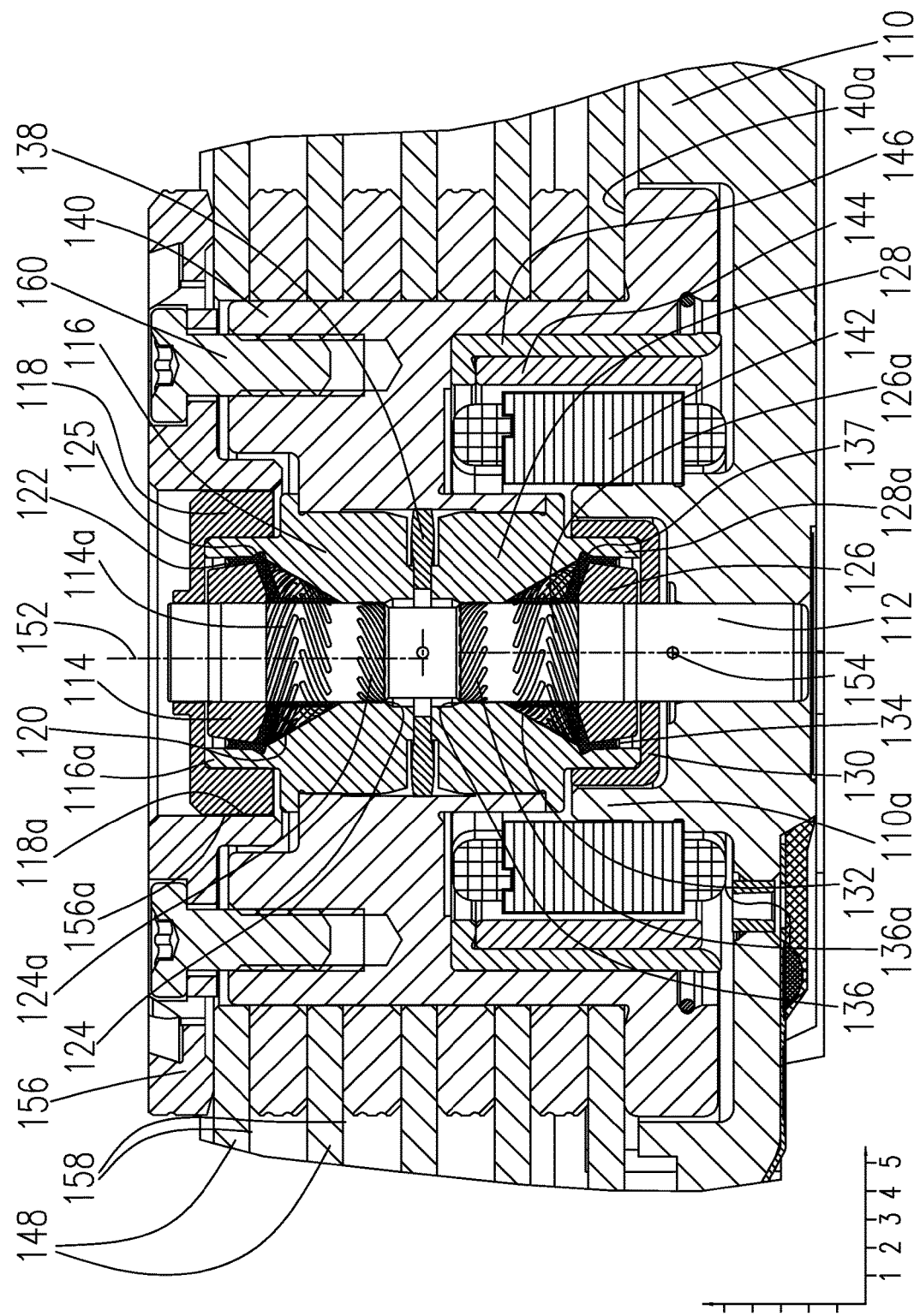
FIG. 2 shows an inventive embodiment of a spindle motor having a fluid dynamic bearing system consisting of two conical bearings.

FIG. 2 shows a section through a spindle motor having a fluid dynamic bearing system with two conical bearings.

The spindle motor comprises a base plate 110 as a supporting structure, in which a fixed shaft 112 is arranged, and wherein a majority of the shaft 112 protrudes above the surface of the base plate. There are two bearing cones 114, 126 which are arranged on the shaft 112 at a mutual distance from another and fixedly connected with the shaft 112. The shaft 112 and the two bearing cones 114, 126 form the fixed component of the fluid dynamic bearing system. The bearing cones 114, 126 have face-to-face conical bearing surfaces extending at an angle to the rotational axis 152. The first bearing cone 114 correlates to a first bearing sleeve 116, which contains a conical bore and a conical bearing surface which is separated from the conical bearing surface of the first cone 114 by a bearing gap 120 filled with bearing fluid. The conical bearing surfaces and the bearing gap 120 extend at an acute angle obliquely to the axis of rotation 152.

The first bearing cone 114 includes bearing grooves 114a distributed over the peripheral surface of its bearing surface. The bearing grooves 114a are inclined at an acute angle to the direction of the rotation and are arranged, for example, in a herringbone pattern. The bearing grooves 114a do not need to be arranged on the bearing surface of the bearing cone 114, but according to the invention can also be arranged on the conical bearing surfaces of the bearing sleeve 116.

The bearing gap 120 has two open ends, each of which are respectively adjacent to the end faces of the bearing sleeve 116. The first open end of the bearing gap 120 is sealed by a capillary seal gap 122, which is restricted through an outer peripheral surface of the first bearing cone 114 and an inner peripheral surface of the edge of the first bearing sleeve 116. The sealing gap 122 forms an obtuse angle (>=90°) with the bearing gap 120 and an acute angle with the axis of rotation 152. The sealing gap 122 is partially filled with bearing fluid and acts as a fluid reservoir and as a compensating volume. Preferably, both of the restricted surfaces on the way from the bearing gap to the outside of the bearing point toward the direction of the axis of rotation with a small angle between 0.5 degrees and 20 degrees, whereas the inclination angle of the inner peripheral surface of the first bearing sleeve 116 is smaller than the inclination angle of the out peripheral surface of the first bearing cone 114 by a few degrees. The lower end of the bearing gap 120 is sealed through a further sealing gap 124, along which there is preferably a dynamic pumping seal 124a as well as a conical capillary seal. The dynamic pumping seal 124a included pumping groove structures which are arranged either on the shaft 112 or the bearing sleeve 116 alongside the sealing gap 124, where the pumping groove structures generate a pumping action in the direction of the bearing gap on the bearing fluid in the sealing gap during rotation of the bearing sleeve. Recirculation channels 125, through which a circulation of the bearing fluid is made possible inside the conical bearing, are preferably arranged in the bearing cone 114.

The second bearing cone 126 has conical bearing surfaces with bearing grooves 126a, which form an acute angle with the axis of rotation 152. The second bearing cone 126 is arranged in a second bearing sleeve 128 which also has conical bearing surfaces which are separated from the conical bearing surfaces of the second bearing cone 126 by a second bearing gap 132, which is filled with bearing fluid. The open ends of the second bearing gap 132 are also sealed through a sealing gap 134 in the form of a conical capillary seal, as well as a sealing gap 136 with a dynamic pumping seal 136a and an additional conical capillary seal. The sealing gap 134 is defined by an outer peripheral surface of the second bearing cone 126 and an inner peripheral surface of the second bearing sleeve 128. The sealing gap 134 forms an obtuse angle (>=90°) with the bearing gap 132 and an acute angle with the axis of rotation 152. Recirculation channels 137, through which a circulation of the bearing fluid is made possible inside the conical bearing, are preferably arranged in the bearing cone 126.

The two bearing sleeves 116 and 128 of the in opposite direction acting conical bearings border on each other and are separated from each other with a spacer 138, which is simultaneously used for compensating the thermal expansion of the material of the bearing sleeves 116, 118. The space between the outer peripheral surface of the shaft 112 and both of the bearing sleeves 116, 128 and the spacer 138 is vented, in order to produce a balance of pressure with the surroundings. The shaft 112 has respective bores 154, which are connected to a central bore of the shaft 112 and connects the interior of the bearing with the outer atmosphere in order to ventilate the interior of the bearing.

The two bearing sleeves 114 and 128 are kept in a central recess of a hub 140 of the spindle motor, by, for example, a press connection and/or by being glued into the hub 140. Here the adhesive can be used as a lubricant for the press connection and to ensure a better seal of the bearing. Both sleeves 116 and 128 preferably have a collar at their outer peripheral surface, which fit tightly on an end side of the edge of the opening of the hub 140. Preferable, the bearing sleeves 116, 128 are made of steel, ceramic, or the like, in particular a material having a small thermal expansion coefficient, whereas the hub 140, for example made of aluminum, a material which has a comparatively large thermal expansion coefficient, has been manufactured with and serves as a carrier for storage disks 148, also made of aluminum. Alternatively, the two bearing sleeves may be integrally made of steel, in particular when the hub carries storage discs made of glass and therefore is also made of steel and is preferably formed integrally with the bearing sleeves. The bearing cones 114, 126 are arranged so, relative to the bearing sleeves 116, 128, that the bearing gaps 120, 132 have a defined width of a few micrometers at room temperature. The carrying capacity of the conical bearing depends, among other things, on the width of the bearing gaps 120, 132 and the viscosity of the bearing fluid contained within.

The spindle motor is driven by an electromagnetic drive system which consists of a stator assembly 142 which is fixed to the base plate 110 and rotor magnet 144 which is fixed to the hub 140 on the opposite side of the stator assembly, which is radially surrounded by a ferromagnetic yoke 146.

The two sealing gaps 122, 134 form the outer boundary of the part of the bearing filled with bearing fluid. In order to avoid contamination entering the sealing gaps 122 and 134 and that only a very small amount of the surface bearing fluid of the sealing gaps evaporates and escapes from the bearing, both of the two individual conical bearings beyond the sealing gaps 122, 134 are covered by a cap 118, 130.

The cap 130 of the lower bearing is formed for example as a simple punched part in the form of a profiled sheet metal ring which has an outer rim that is attached and glued to an edge 128a of the sleeve 128. The cap 130 extends radially inward toward the shaft 112 and forms a narrow air gap together with the surface of the shaft.

The upper conical bearing is provided with the cap 118, which is also placed over an edge 116a of the upper bearing sleeve 116 and fixed there.

The upper cap 118 consists of a precisely manufactured rotary component having a particularly precise machined outer peripheral surface 118a.

At this peripheral surface 118a of an inner peripheral surface 156a is aligned with a disk clamp 156 in relation to the axis of rotation 152 and centered. By means of the disk clamp 156 a group of disks 148 are supported on a support surface 140a of the hub 140. The storage disk 148 is axially separated from each other by spacers 158.

After the alignment and the centering of the cap 118, the disk clamp 156 is connected and fixed by screws 160 to the hub 140.

LIST OF REFERENCE NUMERALS 10 base plate
12 shaft
14 rotor component
14a bearing sleeve
14b contact surface
14c groove
14d edge
16 fixed bearing component
18 annular bearing component
20 bearing gap
22a, b radial bearing
24 separator gap
26 thrust bearing
27 gap
28 recirculation channel
30 cap
30a peripheral surface
32 sealing gap
34 sealing gap
36 pumping seal
38 axis of rotation
40 stator assembly
42 rotor magnet
44 disk clamp
46 screw
48 storage disk
50 spacer
52 air gap
54 thrust bearing
110 base plate 110a flange
112 shaft
114 first bearing cone
114a bearing grooves
116 first bearing sleeve
116a edge
118 cap
118a peripheral surface
120 first bearing gap
122 sealing gap
124 sealing gap
124a pumping seal
125 recirculation channel
126 second bearing cone
126a bearing grooves
128 second bearing sleeve
128a edge
130 cap
132 second bearing gap
134 sealing gap
136 sealing gap
136a pumping seal
137 recirculation channel
138 spacer
140 hub
140a contact surface
142 stator assembly
144 rotor magnet
146 yoke
148 storage disk
152 axis of rotation
154 bore
156 disk clamp
158 spacer
160 screw

The invention claimed is:

1. A spindle motor for driving a hard disk drive, comprising: a stationary motor component (10, 12, 16, 18, 110, 112, 114, 126), a rotatable motor component (14, 116, 128, 140) which is rotatably supported relative to the stationary motor component by means of a fluid dynamic bearing system, a bearing gap (20, 120, 132) between the fixed motor component (10, 12, 16, 18, 110, 112, 114, 126) and the rotatable motor component (14, 116, 128, 140) is disposed and filled with a bearing fluid, having at least one open end, at least one sealing gap (34, 122, 134) for sealing the open end of the bearing gap (20, 120, 132), at least one cap (30, 118) to cover the sealing gap (34, 122, 134), the cap being fixed on the rotatable motor component (14, 116, 128) is fixed, a disk clamp (44, 156) for fixing at least one magnetic storage disk (48, 148) on the rotatable motor component (14, 140), an electromagnetic drive system (40, 42, 142, 144) to drive the rotatable motor component (14, 116, 128, 140), characterized in, that the disk clamp (44, 156) abuts on and is centered on a radially facing peripheral surface of the cover cap (30, 118).

2. A spindle motor according to claim 1, characterized in that the disk clamp (44, 156), having an inner peripheral surface (44a, 156a), is centered on an outer peripheral surface (30a, 118a) of the cover cap (30, 118).

3. A spindle motor according to claim 1, characterized in that the disk clamp (44, 156) is fixed with the rotatable motor component (14, 140) by means of screw connections.

4. A spindle motor according to claim 1, characterized in that the cover cap (30) is designed as a machined turned part.

5. A spindle motor according to claim 1, characterized in that the bearing gap (120, 132) has at least two open ends with sealing arrangements (122, 134) which are covered by a first and second cover cap (118, 130) respectively, where the disk clamp (156) is centered on the first cap (118) and the second cap (130) differs in shape from the first cap.

6. A spindle motor according to claim 5, characterized in that the first cap (118) is designed as a machined turned part.

7. A spindle motor according to claim 5, characterized in that the second cap (130) is designed as a stamping or pressing part.

8. A spindle motor according to claim 1, characterized in that the fluid dynamic bearing comprises at least two fluid dynamic radial bearings (22a, 22b) and at least one fluid dynamic thrust bearing (26, 54).

9. A spindle motor according to claim 1, characterized in that the fluid dynamic bearing comprises two oppositely acting fluid dynamic bearings with conical bearing surfaces.

10. A hard disk drive with a spindle motor according to claim 1.

* * * * *